(12) United States Patent
Grasselt et al.

(10) Patent No.: US 10,747,716 B2
(45) Date of Patent: *Aug. 18, 2020

(54) RULE GENERATION IN A DATA GOVERNANCE FRAMEWORK

(71) Applicant: INTERNATIONAL BUSINESS MACHINES CORPORATION, Armonk, NY (US)

(72) Inventors: Mike W. Grasselt, Leinfelden-Echterdingen (DE); Yannick Saillet, Stuttgart (DE); Marvin Schaefer, Bovenden (DE)

(73) Assignee: International Business Machines Corporation, Armonk, NY (US)

( * ) Notice: Subject to any disclaimer, the term of this patent is extended or adjusted under 35 U.S.C. 154(b) by 315 days.

This patent is subject to a terminal disclaimer.

(21) Appl. No.: 15/837,484

(22) Filed: Dec. 11, 2017

(65) Prior Publication Data
US 2018/0101538 A1 Apr. 12, 2018

Related U.S. Application Data

(63) Continuation of application No. 15/150,488, filed on May 10, 2016, now Pat. No. 10,185,720.

(51) Int. Cl.
*G06F 16/00* (2019.01)
*G06F 16/11* (2019.01)
(Continued)

(52) U.S. Cl.
CPC .......... *G06F 16/122* (2019.01); *G06F 16/288* (2019.01); *G06F 16/3344* (2019.01);
(Continued)

(58) Field of Classification Search
CPC .. G06F 17/2282; G06F 17/27; G06F 17/2795; G06F 17/30082; G06F 16/122;
(Continued)

(56) References Cited

U.S. PATENT DOCUMENTS 6,556,964 B2 * 4/2003 Haug .................. G06F 40/216
704/9
7,444,314 B2 10/2008 Rouvellou et al.
(Continued)

FOREIGN PATENT DOCUMENTS

CN 102768682 A 11/2012
EP 2402897 A1 1/2012

OTHER PUBLICATIONS

Arsanjani, "Rule Object 2001: A Pattern Language for Adaptive and Scalable Business Rule Construction", Proceedings of the 8th Conference on Pattern Languages of Programs (PLoP), 2001, pp. 1-33.
(Continued)

*Primary Examiner* — Anh Ly
(74) *Attorney, Agent, or Firm* — Richard A. Wilhelm (57) ABSTRACT

The invention relates to computer-implemented method for supplementing a data governance framework with one or more new data governance technical rules. The method comprises providing a plurality of expressions and a first mapping. The expressions assign natural language patterns to technical language patterns. The first mapping maps first terms to data sources. A rule generator receives a new natural language (NL) rule comprising one or more natural-language patterns and one or more first terms. The rule generator resolves the new NL rule into one or more new technical rules interpretable by a respective rule engine and stores the one or more technical rules in a rule repository.

18 Claims, 6 Drawing Sheets

(51) Int. Cl.
*G06F 16/34* (2019.01)
*G06F 16/33* (2019.01)
*G06F 16/28* (2019.01)
*G06F 40/16* (2020.01)
*G06F 40/247* (2020.01)

(52) U.S. Cl.
CPC .............. *G06F 16/34* (2019.01); *G06F 40/16* (2020.01); *G06F 40/247* (2020.01)

(58) Field of Classification Search
CPC .... G06F 16/34; G06F 16/288; G06F 16/3344; G06F 16/00; G06F 40/16; G06F 40/247; G06F 17/30716; G06F 17/30; G06F 16/185; G06F 11/1446
See application file for complete search history.

(56) References Cited

U.S. PATENT DOCUMENTS

| | | | |
|---|---|---|---|
| 7,603,358 B1* | 10/2009 | Anderson | G06F 21/6218 |
| 8,418,135 B2 | 4/2013 | Proctor et al. | |
| 8,689,175 B2 | 4/2014 | Matsumoto | |
| 8,849,673 B2* | 9/2014 | Pillai | G06Q 10/06 |
| | | | 704/275 |
| 2003/0229605 A1* | 12/2003 | Herrera | G06N 5/022 |
| | | | 706/47 |
| 2005/0096959 A1 | 5/2005 | Kumar et al. | |
| 2008/0086300 A1* | 4/2008 | Anismovich | G06F 40/56 |
| | | | 704/9 |
| 2008/0097748 A1* | 4/2008 | Haley | G06F 16/3329 |
| | | | 704/9 |
| 2008/0301078 A1* | 12/2008 | Proctor | G06N 5/022 |
| | | | 706/47 |
| 2011/0071979 A1 | 3/2011 | Tahiliani et al. | |
| 2011/0288852 A1* | 11/2011 | Dymetman | G06F 40/44 |
| | | | 704/4 |
| 2012/0239612 A1* | 9/2012 | George | G06F 16/254 |
| | | | 707/602 |
| 2013/0006608 A1 | 1/2013 | Dehors et al. | |
| 2014/0039879 A1 | 2/2014 | Berman | |
| 2014/0058763 A1* | 2/2014 | Zizzamia | G06Q 40/08 |
| | | | 705/4 |
| 2014/0379652 A1 | 12/2014 | Balasa et al. | |
| 2015/0160988 A1* | 6/2015 | Scomparim | G06F 7/00 |
| | | | 719/318 |
| 2015/0293834 A1 | 10/2015 | Potdar | |
| 2016/0048504 A1* | 2/2016 | Narayanan | G06F 17/2755 |
| | | | 704/9 |
| 2017/0124443 A1* | 5/2017 | Morikawa | B42D 25/41 |
| 2017/0255647 A1* | 9/2017 | Zhu | G06F 16/583 |
| 2018/0201126 A1* | 7/2018 | Yuma | F16H 61/12 |
| 2018/0204111 A1* | 7/2018 | Zadeh | G06N 3/0436 |
| 2018/0314689 A1* | 11/2018 | Wang | G06F 40/58 |

OTHER PUBLICATIONS

Wikipedia, "Data governance", printed on Apr. 12, 2016, pp. 1-5, https://en.wikipedia.org/wiki/Data_governance.

Grasselt et al., U.S. Appl. No. 15/150,488, filed May 10, 2016, entitled "Rule Generation in a Data Governance Framework", pp. 1-57.

IBM: List of IBM Patents or Patent Applications Treated As Related (Appendix P), Dec. 28, 2017, pp. 1-2.

\* cited by examiner

RULE GENERATION IN A DATA GOVERNANCE FRAMEWORK

BACKGROUND

The present invention relates to data processing, and more specifically to data governance tools and frameworks.

Data governance is a control that ensures that the data entry by an operations team member or by an automated process meets precise standards, for example, business requirements, a technical constraints, security-related constraints, data definitions, and data integrity constraints in a data model. Data governance is a critical problem for any company dealing with data. Regulation laws require those companies to implement governance rules to ensure that aspects like data privacy and data quality are enforced. Data governance policies are implemented in a broad variety of data governance tools of different vendors using different, vendor-specific data formats and program interfaces.

Typically, a technically-trained user is required in order to configure and maintain the data governance tools since a business user is not familiar with technical interfaces, technical languages and various technical configuration options that have to be used or manipulated in order to correctly configure and execute a data governance tool for fulfilling a particular data governance task. The specification of the technical instructions for the data governance tools is a complicated, time-consuming task that needs to be performed by a technician skilled person in a plurality of different technical languages. However, the technical expert is usually not an expert regarding the requirements of a business user. Extensive communication and information exchange between a business user and a technical user is necessary in order to implement business requirements in a data governance framework correctly. As business requirements change frequently, there is a need in the art for accelerating the implementation of new or amended data governance policies in a data governance framework.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for supplementing a data governance framework with one or more new data governance technical rules. The method comprises: providing a plurality of expressions, each expression being a data structure assigning a natural language pattern to one or more functionally equivalent, technical language patterns interpretable by a respective rule engine; providing a first mapping that maps first terms to data sources; receiving, by a rule generator, a new NL rule, the new NL rule being a data governance rule comprising one or more natural-language patterns and comprising one or more first terms; resolving, by the rule generator, the new NL rule into the one or more new technical rules; and storing the one or more technical rules in a rule repository. The resolution comprises: replacing the one or more natural language patterns of the received new NL rule by one or more functionally equivalent, technical language patterns in accordance with at least one of the plurality of expressions, thereby creating one or more translated rules from the new NL rule; replacing each first term in each of the one or more translated rules with the name of the data source mapped to the first term in the first mapping; assigning to each of the one or more translated rules the one of the rules engines capable of interpreting the one or more functionally equivalent, technical language patterns contained in the translated rule, thereby providing the one or more technical rules, each of the technical rules being functionally equivalent to the new NL rule and being interpretable by its assigned rules engine.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout. Embodiments of the invention allows a business user to specify, using natural language (NL), a data governance rule that is automatically translated in a technical rule that can be executed by a rules engine. Thereby, the data container names comprising the data are resolved automatically by the rules engines. Assistance of a technical expert being familiar with a particular rules engine syntax is not necessary for adapting existing or creating new data compliance rules that can be executed by appropriate rules engine. Thus, a data governance framework is provided that is more flexible and easier to use by business-users.

Figure 1:
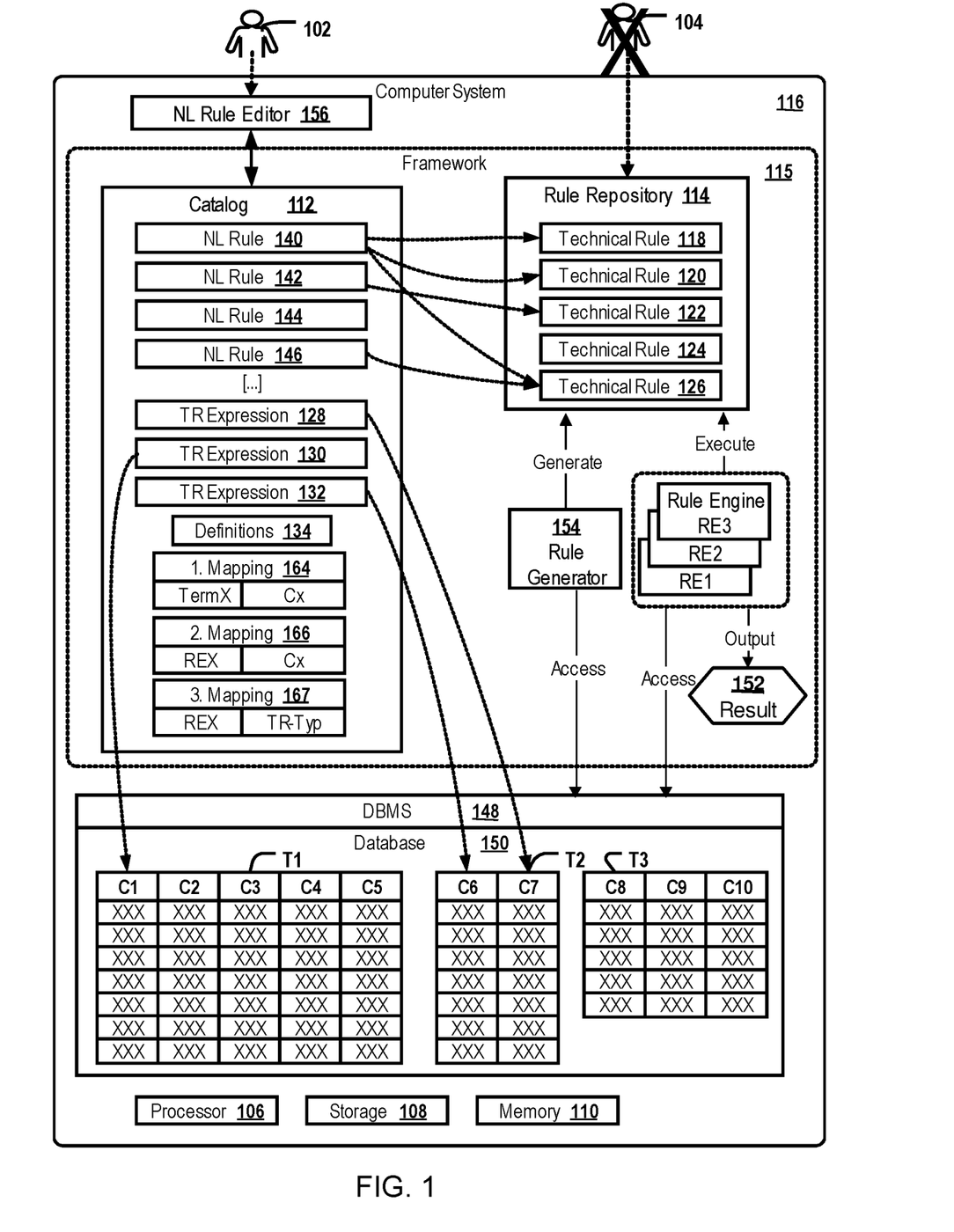
FIG. 1 depicts a system comprising a data governance framework according to an embodiment of the present invention.

FIG. 1 depicts a computer system 116 comprising a data governance framework 115 according to an embodiment of the present invention. The computer system may be, for example, a standard computer, a server computer or a distributed computer system, e.g. a cloud-based computer system. The system 116 comprises one or more processors 106, a main memory 110, one or more non-volatile storage devices 108 having stored instructions implementing the framework 115 and/or a database management system (DBMS) 148. The DBMS manages a database 150 comprises a plurality of data sources in the form of database tables T1, T2, T3 and columns C1-C10 having stored therein data whose consistency, integrity, completeness, and other features are to be controlled and evaluated by means of the data governance framework. The number of tables T1-T3 and the number of columns C1-C10 are shown as an exemplarily number, respectively, and it is not intended to be a limiting number of each.

The framework 115 is operatively coupled to the database 150 and comprises a plurality of rule engines RE1-RE3, a rule repository 114, and a catalogue 112. The catalogue comprises a first mapping 164 and optionally also a second mapping 166 and/or third mapping 167. The number of rule engines RE1-RE3 is shown as an exemplarily number, and it is not intended to be a limiting number.

The catalogue comprises a plurality of TR expressions 128-132 is shown as an exemplarily number, and it is not intended to be a limiting number. The rule engines RE1, RE2, RE3 may be provided by different vendors and/or may comprise stored procedure specified in the database 150 by a technically skilled user 104.

An "expression" as used herein is a data structure, e.g. a database record or a file, assigning a natural language pattern to one or more functionally equivalent, technical language patterns. A "natural language pattern" is a specification of a data governance operation in natural language, i.e., in a language a user 102 without any programming skills or knowledge of syntax requirements of individual rule engines can use. A "technical language pattern" is a specification of a data governance operation in a technical language, i.e., in a syntax that is interpretable by one or more of the rule engines RE1-RE3. A "rule" as used herein is a data structure comprising a specification of operations, definitions, conditions and/or constraints that can be evaluated by a rules engine to achieve a goal. The rules editor 156, according to embodiments, permits users to author a data governance rule utilizing natural language (nl) syntax. Thus offered rules may be translated into one or more technical rules specified in the particular technical syntax of a respective rules engine. According to embodiments, the rule generator 154 is further configured to deploy or publish the technical rule to a respective rules engine RE1, RE2, RE3. A data governance framework as used herein is a purely software, purely hardware or software- and hardware-based IT infrastructure for implementing and executing data governance policies.

The catalogue further comprises a first mapping assigning a plurality of first terms, e.g. "person" or "product" to data sources, e.g. to one or more tables T1-T3 or columns C1-C10 in the database 150.

A user 102, e.g. a business analyst, may specify a natural language (NL) data governance rule 140 via a GUI of a NL rule editor 156. The NL rule editor 156 may be part of the framework 115 or may be installed on a different machine. The NL rule is provided to a rule generator 154, e.g. an application program or module configured to transform the NL rule into one or more technical data governance rules. The "X" over the technically skilled user 104 indicates that a business analyst user 102 not having any technical knowledge of the framework is able to specify NL rules via an NL rule editor 156 without the help of a technically skilled user. The new NL rule 140 is a data governance rule comprising one or more natural-language patterns and comprising one or more first terms.

The rule generator 154 receives the newly specified NL rule 140, e.g. receives it directly from the rule editor 156 or reads it from a data store, e.g. the catalogue, comprising the NL rule 140 and optionally also further NL-rules 142-146. The rule generator 154 may be, for example, an application program or module. The rule generator 154 resolves the new NL rule into one or more new technical rules 118-126. The resolution includes replacing the one or more natural language patterns of the received new NL rule 140 by one or more functionally equivalent, technical language patterns. The catalogue may comprise a plurality of TR expressions 128-132. Each expression is a data structure assigning a natural language pattern to one or more functionally equivalent technical language patterns. Each technical language pattern is specified in a syntax that can be interpreted by at least one of the rule engines RE1-RE3. The resolution includes replacing each first term in each of the one or more translated rules with the name of the data source mapped to the first term in the first mapping. For example, the first term "person" may be replaced by the name of the table "T2" comprising data records relating to instances of "person" data objects. The resolution includes assigning to each of the one or more translated rules the one of the rules engines capable of interpreting the one or more functionally equivalent, technical language patterns contained in the translated rule; for example, the assignment may be based on evaluating further mappings 166, 167, which assign rule engines RE1, RE2, RE# to data sources and technical rule types to rule engines RE1, RE2, RE3. The one or more technical rules generated from the NL rule 140 are functionally equivalent to the NL rule 140 and are interpretable by their assigned rules engine(s) RE1, RE2, RE3. The resolution includes storing the one or more generated technical rules in a rule repository 114. The rule repository 114 may comprise a plurality of technical rules 118-126 having been created by the rule generator 154 by transforming previously specified NL rules. At least some of the generated technical rules 118-126 are configured to return an output result 152 when a respectively assigned rule engine RE1, RE2, RE3 executes the technical rule on its assigned data source(s).

Figure 2:
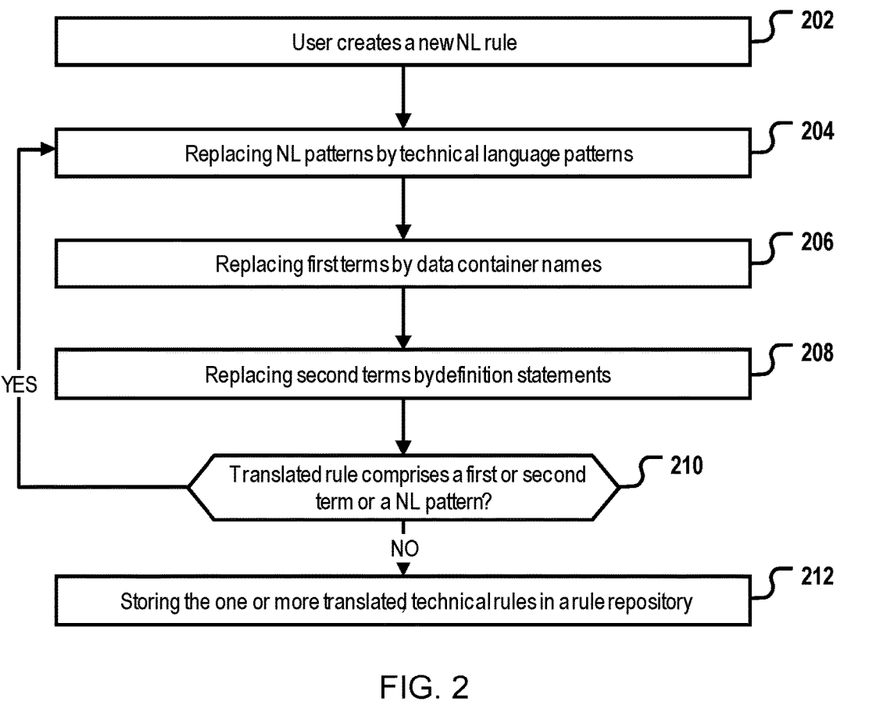
FIG. 2 depicts a method for automatically creating new technical data governance rules according to an embodiment of the present invention.

FIG. 2 depicts a method for automatically creating new technical data governance rules according to an embodiment of the present invention. In a first step 202, a user 102 creates a new NL rule 140 via a GUI of a NL rule editor 156. The NL rule 140 describes in plain text English data governance policies that should be enforced on data objects such as "persons", "junior manager", "child", "product", and others.

A user creates, using the rule editor 156, the new NL rule "A person should have a name". Once or while the NL rule is entered via the GUI of the NL rule editor 156, the NL rule editor 156 accesses a catalogue 112. The catalogue 112 includes a plurality of TR expressions 128-132, respectively, mapping one or more natural language patterns 302 relating to the same semantic concept to one or more technical language patterns 304 interpretable by at least one rule engine RE1-RE3. The NL rule editor 156 is operatively coupled to a rule generator 154 and provides the NL rule 140 to the rule generator 154.

Figure 3:
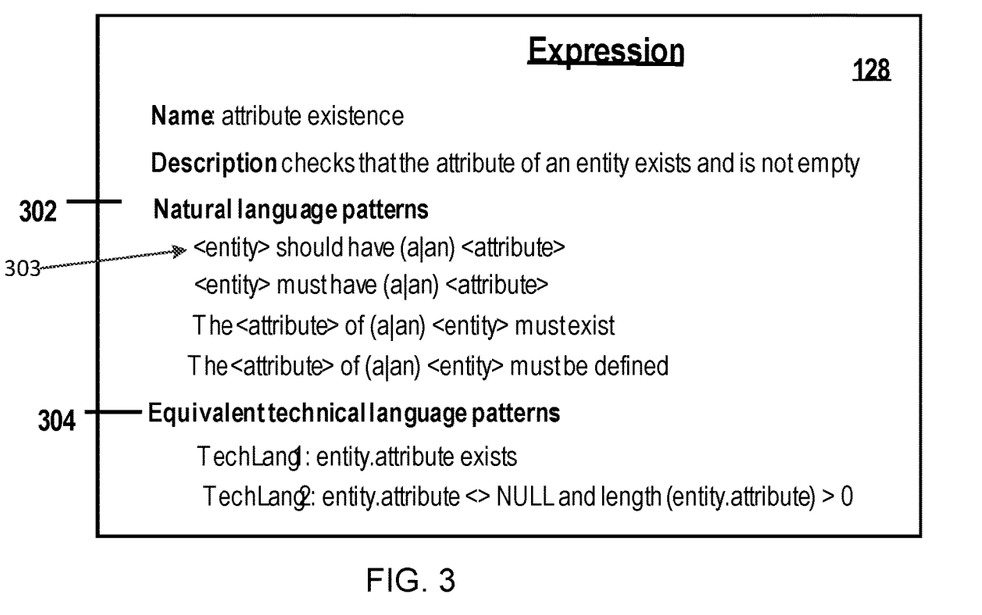
FIG. 3 depicts an expression comprising a set of NL patterns mapped to functionally equivalent technical language patterns.

The rule generator 154 evaluates the expressions in the catalogue 112 for identifying one or more NL patterns that correspond to the NL text "a person should have a name" contained in the NL rule 140. In the example illustrated in FIG. 3, the NL pattern 303 would match and two translated rules would be generated in step 204 by replacing the "should have a name" with a respective one of the two technical language patterns 304.

Moreover, in step 206, first terms, e.g. "person" in the generated translated rules are respectively replaced by the names of data sources comprising attributes of persons, e.g. a set of columns C1, C2, C3, C10. In order to perform this step, the rule generator 154 may access a first mapping 164 contained in the catalogue 112 for identifying all tables T1-T3 and columns C1-C10 mapped to the first term "person".

In step 208, second terms, e.g. "child", "junior manager" or "senior manager" which may be contained in the generated translated rules are respectively replaced by definition statements which are mapped according to a set of definitions 134 in the catalogue 112 to the second terms. The resulting translated rule thus may comprise one or more definition statements which again may comprise first and/or second terms.

In step 210, the rule generator checks, for each of the translated rules, if it comprises further first and/or second terms or a NL pattern having e.g. being introduced in a previous step as part of the definition statement. If "yes", the rule generator repeats the steps 204-210 for the translated rule until all natural language patterns have been replaced by semantically equivalent technical language patterns, all first terms have been replaced by data container names and all second terms have been replaced by a definition statement whose first and second terms and NL patterns could be completely replaced by technical language patterns and data container names or if an alternative termination criterion is reached. If "no", the rule generator 154 stores the one or more generated, translated technical rules in a rule repository 114, in step 212.

According to preferred embodiments, once the NL rule has been completely translated into one or more technical rules 118-126, the rule generator 154 automatically identifies one or more rule engines RE1, RE2, RE3, that are capable of accessing the data containers specified in the technical rule 118-126 and capable of interpreting and executing the technical language patterns contained in the technical rule 118-126. For this purpose, the rule generator may access a second mapping 164 assigning rule engines RE1, RE2, RE3, to data sources and a third mapping 167 assigning rule engines to types of technical rules (e.g. SQL-script, IBM Guardium-rule, IBM InfoSphere rule, etc.). An identifier of the identified rule engine(s) RE1, RE2, RE3, capable of accessing the data containers specified in the technical rule and of running the technical language patterns specified therein may be stored in association with the generated technical rule in the rule repository 114.

In the following, various examples will be presented to illustrate how embodiments of the invention may be used for providing an improved data governance framework 115.

According to one example, a new NL rule 140 may comprise a first term representing an entity (data object type) corresponding to the name "person". This entity has an attribute "name". One of the TR expressions 128-132 currently defined in the business catalog has a NL pattern 303 "<entity> should have (a|an) <attribute>" that matches the NL pattern "A person should have a name" in the new NL rule. The TR expression 128 represents a data governance policy of checking that the attribute of an entity exists. The set of NL patterns 302 comprises different types of wordings that a business user may use to express this policy. For instance some may write "a person should have a name", other may write "a person must have a name", others may also write "the name of a person must exists", etc. The different NL patterns cover the most common NL patterns business users would naturally use to express this policy in their natural language. The TR expression 128 also comprises one or more functionally equivalent technical language pattern that define the syntax used for generating a respective translated technical rule from the NL rule 140.

The "first terms" may comprise, for example, object type names, attributes of the object types, and constants. For example, instead of explicitly specifying a number, e.g. 18, as the legal age in a rule or definition, it may be preferable to specify a constant like "LegalAge" whose respective value, e.g. 18, is stored in a respective data source. In case the legal age in a country is amended, the corresponding value needs to be modified only once, not in all definitions or rules which evaluate the legal age of a person.

The definitions 134 may comprise NL patterns and technical language patterns relating to a plurality of different data governance aspects such as, tests, constraints, functions, filters, operations, actions, etc.

According to another example, a business user defines another NL rule "A child must have a legal representative". In this example the term "legal representative" can be found in the business catalog as being a first term having assigned a data container, e.g. a column, and being of type "attribute" assigned to one or more data object types (e.g. "person", "manager"; etc). The words "must have" followed by an attribute can also be identified as being one of the NL patterns 302 that has been defined in the "attribute existence" constraint from the previous example. But the word "child" cannot be mapped to any known first or second term stored in the catalogue 112 and is thus at least temporarily an "irresolvable" term. In that case the rule editor 156 displays a warning to the user that "child" is an unknown term and asks the user what he or she wants to do with it. For example, the rule editor 156 may create a GUI prompting a user to select or perform one of the following options: a) create a new second term based on that new word and if possible give it a definition b) search the catalogue 112 for a similar term that could be a synonym and used in place of the word "child" c) store the NL rule as is to resolve the term "child" later. The rule will be then put in a status indicating that it cannot be executed because it is not fully understood by the system.

In the above mentioned example, the rule editor 156 may display a warning message to user 102: "I don't know what a "child" is". To resolve this problem, the user may enter a new definition for the unknown term "child" in natural language into the GUI of the editor: "A child is a person with an age under 18". This new definition is stored in association with the new second term "child" in a set of definitions 134 that may be stored in the catalogue. Now, the NL rule editor 156 determines that the new NL rule can fully be resolved and provides the NL rule to the rule generator 154, e.g. by storing the NL rule in the rule repository 114 that is accessible by the rule generator 154. According to embodiments, the rule editor and the rule generator are part of a single application program.

When the rule generator 154 converts the new NL rule into one or more technical rules, the system can fully resolve the first rule as well as other rules referencing the second term "child". The conversion of the NL rule into one or more technical rules may be performed iteratively for unfolding a hierarchy of natural language based definitions. The transformation of a new NL rule "A child should have no profession" based on a definition of a "child" as "A child is a person with an age under 18" will generate the translated, partially resolved NL rule "A person with an age under 18 should have no profession". By replacing natural language patterns in the partially resolved NL rule, the following (still not completely resolved) technical rule may be created: "IF person.age <18 THEN profession='inactive'". By replacing all first terms with the names of data sources mapped to the first terms in the first mapping 164, the following, fully resolved technical rule is created: "IF EMPLOYEE.AGE<18 THEN EMPLOYEE.PROFESSION="inactive"; IF CUSTOMER.AGE<18 THEN CUSTOMER.PROFESSION="inactive"". This technical rule is stored in association with an ID of a rule engine RE1, RE2, RE3, capable of executing the rule in a rule repository. At a later moment in time, this rule engine will execute the technical rule on the column "profession" in table "employee" and on column "age" of table "customer".

According to some embodiments, the data governance framework includes a NL rule editor 156 configured to learn new synonyms from the user input. For example, in case the user 102 repeatedly enters the unknown term "top manager", the NL rule editor 156 repeatedly presents a user a list of known first or second terms comprising the known term "senior manager" and in case the user repeatedly selects the term "senior manager" to be used instead of the unknown term, the editor may automatically store the term "top manager" as a synonym term for the term "senior manager" in the catalogue 112. The next time the user 102 enters a NL rule or a new definition comprising the term "top manager", the editor will check if the catalog comprises any information indicating that the "top manager" is a synonym to a known term. In this case, the editor will automatically replace the term "top manager" by the term "senior manager" and thus will automatically resolve the "unknown" or "irresolvable" term without the help of the user.

Figure 4:
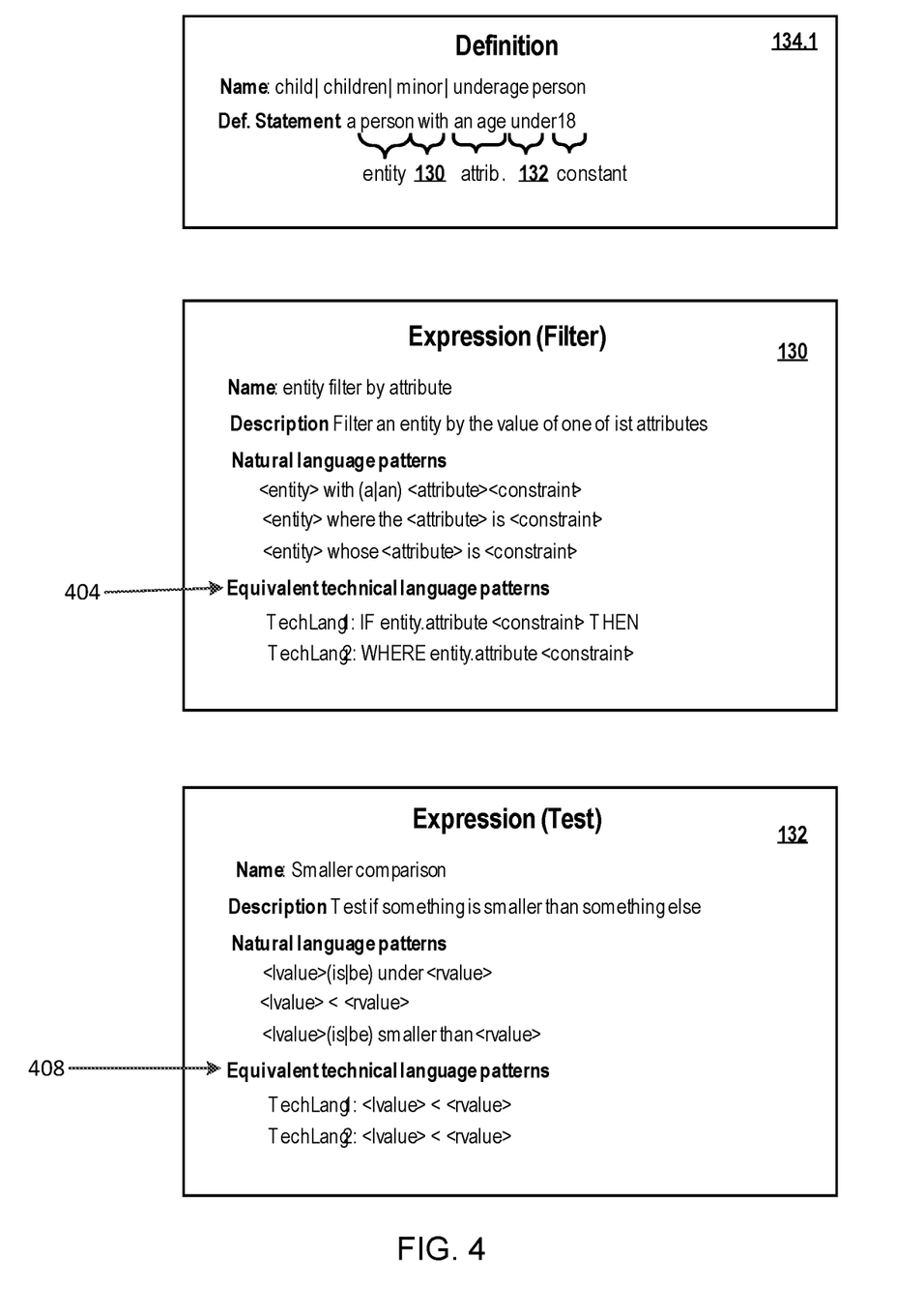
FIG. 4 depicts a definition and two further expressions.

FIG. 4 depicts aspects of a further embodiment of the invention. The catalogue 112 comprises a set of expressions of different types, e.g. an expression 130 of the filter type that can be used to select a subset of data records stored in a data container, e.g. for selecting all child-person-records stored in the table "persons". The catalogue further comprises an expression 132 of the test-type for comparing the value of an attribute with a given reference value. The catalogue comprises a definition 134.1 of the second term "child" as "a person with an age under 18". When a new NL rule "a child must have a legal representative" needs to be translated into technical rules, the rule generator can easily translate the word "child" in the original NL pattern in the NL rule entered by the user by replacing it with the definition statement in 134.1. Thus, a (not yet completely) translated rule "A person with an age under 18 must have a legal representative" is created where each word can be mapped to either a data source (having stored therein e.g. an entity or an attribute), a further definition statement or a technical rule pattern 404, 408.

In the depicted example, the term "person" has been found as a first term in the first mapping that corresponds to a particular entity and is linked to a particular database table. The word "age" is a further first term linked to another data source, e.g. a column representing an existing attribute. The term "18" is another first term that is mapped to a further data source comprising a constant data value, e.g. the number "18". The NL rule translation by the rule generator 154 comprises identifying the term "person" as a known first (entity) term and matching it to the "<entity>" placeholder, identifying the term "age" as a known first (attribute) term and matching it to the "<attribute>" placeholder and identifying a known NL pattern "with" and/or "under" as known NL pattern and matching the identified NL patterns to functionally equivalent technical language patterns of an existing (filter or test) expression 130, 132.

Thus, a very comfortable and intuitive way of defining data governance rules by a business user is provided. The data governance framework 115 is able to learn new terms, synonyms and definition from a user who may use his natural language to create definitions and data governance rules without consulting a technical expert. Thus, the data government framework continuously learns more terms and definitions, thereby creating a highly complex and typically hierarchical portfolio of rules and definitions that can be reused for defining further rules and definitions. According to embodiments, teaching new terms and definitions to the data governance framework feels like teaching a language to a child: the system indicates to the user 102 what it doesn't know yet and asks for a definition of it, the same way a child would ask an adult what this new word he just heard means. Keeping the definition of what a child is separated from the rules using it allows more flexibility in case a definition needs to be changed. If the legal majority age needs to be modified from 18 to 21, only that definition needs to be modified. All the NL rules 140-146 using the term "child" would remain unchanged and new technical rules having incorporated the new legal majority age can easily and automatically generated by the rule generator as described for embodiments of the invention.

According to embodiments, the NL rule editor 156 and/or the rule generator 154 can automatically recognize if a NL rule is complete enough to be automatically convertible to a technical rule. Moreover, the rule creator is capable of automatically determining, by accessing the catalogue comprising a plurality of mappings, which physical data sources should be governed by the technical rules generated from the NL rule and which ones of the available rule engines shall be actually used for executing the technical rule.

According to an aspect, embodiments of the invention do not require different people with different skills in order to successfully implement a required data governance policy. Moreover, as the generation of the technical rules from the NL rule is a fully automated process, the business user having specified the NL rule can be sure that the generated technical rule implements the desired policy. He or she does not have to test the rules with test and thus a quicker and cheaper process of implementing new data governance policies is provided. Moreover, changes in a business rule can easily implemented as no technical user is required to modify and redeploy the technical rules.

According to embodiments, each of the rules engines is a data governance tool. A "data governance tool" as used herein is an executable program logic configured for performing a data governance task, e.g. performing some syntax checking, consistency or completeness checking, or the like. A data governance tool may be an application program having been developed specifically for a data governance task or comprising one or more data governance functions, e.g. "Adeptia Data Transformation Server" of Adeptia Inc., "InfoExpose" of AMB, "BDQ Analysis" of Business Data Quality Ltd, "InfoSphere™ Master Data Management Server", "Content Manager", and "Rational Data Architect" of IBM and others. For instance, data masking technical rules could be performed by the IBM InfoSphere Optim product, technical data quality rules could be performed by IBM InfoSphere Information Analyzer or by a master data management software, and data access rules could be performed by IBM® Security Guardium.

A data governance tool may be an application program having been developed for a different purpose but being usable also for data governance tasks. For example, database management systems (DBMS) are capable of executing skips and stored procedures which may implement some data governance logic, e.g. checking that a particular column is never assigned a NULL value, checking if all data values in a particular column have a particular type, show a particular pattern, or the like.

In some cases, a particular NL rule is translated into multiple technical rules, which implement the same data governance policy, but are interpretable by different rule engines using different technologies.

Thus, the data governance framework may comprise data governance tools explicitly developed and marketed as data governance tools, and/or may comprise data governance tools that are not specifically developed and marketed as governance tools addressing governance needs. The data governance framework may comprise a plurality of data governance tools. The assignment of technical language patterns to data governance tools capable to interpret technical rules comprising the patterns may allow for seamlessly integrating and using a plurality of different data governance tools in a single framework.

According to embodiments, each first term represents a first data object type. Each first term is mapped in a first mapping to a first data source used as dedicated data container for selectively storing data object instances of the one of the first data object types. The data container used for storing the instances of the first data object type is free of instances of other first data object types represented by other first terms contained in the first mapping. For example, the first mapping may comprise a first term "person", and/or "product", and/or several other first terms. The first term "person" is linked in the first mapping to a particular data container, e.g. a database table "person" comprising several columns e.g. for the name, e-mail, phone number and other person-related attributes. The data container may also comprise one or more columns belonging to the same or to multiple different columns of a database. The first term "product" is linked in the first mapping to another data container, e.g. another database table "product" comprising several columns e.g. for the name, the price, the manufacturing costs and other attributes of a product. The "person" table solely comprises data related to "person" instances and the "product" table solely comprises data related to "product instances". Thus, a "first term" is a term that is mapped in the first mapping to a respective data container, e.g. a particular file directory, file, database table, database column or a set of directories, files, tables and/or columns. According to embodiments, the first data container solely comprises instances of a data object type that is represented by and referred to as the first term.

According to embodiments, the received new NL rule comprises one or more second terms. Each second term is a term not having assigned in the first mapping (nor, preferentially, in another mapping contained in the framework) one of the data sources. In other words, contrary to a "first term", a "second term" according to embodiments of the invention does not correspond to a dedicated data container that is solely used for storing instances of data object types represented by and referred to as the second term. Rather, it is possible that instances of multiple different data object types corresponding to multiple different second terms are stored in the same data container.

The governance framework is providing with a set of definitions. Each definition is a data structure associating a second term with a definition statement of the second term. The definition statement is specified in natural language, e.g. by business user via NL rule editor 156 and comprises one or more natural language patterns. The definition statement of one or more of the definitions comprises one or more first and/or one or more second terms.

For example, the data governance framework may comprise a plurality of definitions. For example, the definition statement of the second term "senior manager" may be: "A senior manager is a manager heading one or more junior managers", wherein "senior manager", "manager" and "junior manager" that are contained within the definition statement are second terms. The definition statements of the terms may comprise zero, one and/or multiple first terms and/or or zero, one or multiple second terms in any combination with each other. At least some definition statements comprise one or more first and one or more second terms.

This allows for the creation of nested definition statements for second terms. The definition statement of a second term may comprise one or more first terms which can be resolved to data container names, and/or may comprise one or more second terms which relate to respective further definitions, and/or definition statements which again may comprise a mixture of zero, one or more first and/or second terms. Thus, a highly complex network of first and second terms, definition statements and data containers can be specified. Further, the complexity of each statement is reduced as the definition of the term "senior manager" does not have to include a definition of "manager" (as the second term may be defined in a separate definition).

According to embodiments, each of the second terms represents a second data object type. For example, the second term "senior manager" may represent the data object type "senior manager" and the second term "junior manager" may represent the data object type "junior manager". At least two of the second terms respectively represent a second data object type which is a sub-type of a first data object type represented by one of the first terms. The instances of the at least two second data object types are stored in the same data container, the data container being represented by the particular first term and being mapped to the particular first term in the first mapping. For example, both "senior manager", "manager" and "junior manager" may be second data object types being a sub-type of the data object type "person". All senior manager and junior manager instances may be stored in the "person" data container, e.g. a "person" database table.

The additional object types (e.g. "senior manager", "junior manager", "employee" or "freelancer") can be defined via second terms and respective definitions and data governance rules can be created for the new object types without changing the underlying database structure. This is because the instances of the new object types represented by second terms are stored in the same data source (table or column). Thus, it is possible to add additional data object type with respective data governance rules to a data governance framework without necessarily modifying the database structure and/or the content of the first mapping.

According to embodiments, the resolving of the new NL rule into one or more technical rules includes replacing each second term contained in the received or translated rule with the definition statement of the second term (which can be derived from the set of definitions stored e.g. in a catalogue of the data governance framework) for outputting a definition-resolved rule. Replacing each natural language pattern contained in the one or more definition statements of the definition-resolved rule by one or more technical language patterns being, according to one or more of the expressions, functionally equivalent to the replaced natural language patterns.

The features may be beneficial as definitions of a second term and respective data object types can be reused for defining further second terms and corresponding data object types. For example, a definition of the term "manager" may include some natural language patterns that are resolvable into technical patterns implementing data governance logic configured to check a requirement that all manager object instances are required to fulfill. In addition, a "senior manager" second term may have assigned a definition comprising further data governance related data checks that are selectively applicable on one or more attributes of senior data object instances. Thus, by reusing existing definitions of existing second terms, it is possible to create a complex hierarchy of second terms, corresponding definitions and corresponding data object types, and to create a complex network of technical patterns contained in respective definition statements that may automatically be integrated in any technical data governance rule that is created for the data object type represented by the second term. In a further beneficial aspect, definitions of second terms and corresponding data object types are stored separate from respective data governance rules. Any change to a definition may thus automatically, upon conversion of the NL rules into technical data governance rules based on the current set of definitions, be propagated to the technical data governance rules generated in the conversion.

According to embodiments, the generation of the technical rules from a NL rule is performed automatically in response to a trigger event. The trigger event may be, for example, the modification of an existing definition, the modification of an expression, the creation of a new NL rule via a NL rule editor 156, or in response to a signal of a regularly executed scheduler. Thus, any modification of a definition or expression is automatically propagated to the set of technical rules to be executed by respective rules engines.

According to embodiments, the resolving of the new NL rule into one or more new technical rules includes checking if a definition statement in the definition-resolved rule comprises one or more further first or second terms. If the definition-resolved rule comprises at least one further second term, iteratively repeating the second-term-replacement and natural-language-pattern-replacement steps until a termination criterion is reached. If the definition-resolved rule comprises at least one further first term, the method comprises replacing each first term in the definition-resolved rule with a name of the data source mapped to the term in the first mapping.

The iterative resolution of second terms within NL rules and the automated resolution of definitions of the second terms allows creating very complex natural language rules. Thus, it may be possible to automatically create a set of technical rules having a complexity that may not be achievable or manageable by a technically skilled user. It is possible to define for a given table corresponding to a particular data object, for example, "person", a plurality of dependent data objects and corresponding second terms, such as, "manager", "child", "customer", "senior manager" or the like which automatically include any data governance policies specified for the "person" data object. The dependent data objects may be associated with additional data governance policies and corresponding rules which selectively operate on data records of a respective dependent data objects. Thus, definitions and expressions mapping NL and technical language patterns can be re-used to construct new definitions which are based on existing definitions. Thereby, a complex hierarchy of definitions can be created that are too complex for being translated by a technical user to corresponding technical rules manually. Each definition is linked via the expressions and the mappings to corresponding technical language patterns and rule engines capable of executing the technical language patterns. Thus, embodiments of the invention allow integrating a complex hierarchy of definitions in the specification of rules in natural language that can automatically be resolved even in cases where the complexity of the rule and the hierarchy would render a manual rule resolution infeasible.

In addition, the features allow for the creation of natural language definitions that may logically link many different data object types and NL rules that are automatically resolved upon rule generation to respective technical data governance rules. Complex definitions that are automatically included in a framework for automated rule generation are advantageous as changes in a single definition can affect many rules but a manual redefinition is not necessary.

According to embodiments, the termination criterion is chosen from at least one of the translated and definition-resolved rule being free of any first term and is free of any second term; this situation occurs when all first terms were replaced by data source names and all second terms were replaced by definition statements lacking a further first or second term, a maximum number of iterations is reached; if at this moment in time there are still first or second terms in the NL rule or translated rule, the rule may be stored as an incompletely resolved rule in the rule repository 114 for later automated resolution or a manual review, the rule generator 154 determines that the translated and definition-resolved rule comprises a term that is neither a first term (a term mapped in the first mapping to a data container) nor a second term (a term for which a definition statements in the set of definitions exists), or the rule generator 154 determines that the translated and definition-resolved rule comprises a term that is neither a first term nor a second term nor a term for which a known synonym exists.

According to embodiments, the resolving of the new NL rule into one or more new technical rules further comprises checking, by the rule generator 154, if the translated rule comprises an irresolvable term.

An "irresolvable term" as used herein is a term that is neither a first term mapped in the first mapping to a data container nor a second term for which a definition statement is available. In embodiments where the data governance framework supports synonym terms, an "irresolvable term" in addition fulfils the condition that the term is not already assigned as a synonym term to a first or second term.

According to embodiments, the method further comprises, in case the translated rule comprises an irresolvable term includes displaying a list of all first terms contained in the first mapping and receiving an indication of the user that the irresolvable term is a synonym to one of the displayed first terms. Replacing, by the rule generator 154 response to the indication, the irresolvable term in the rule by the indicated first term and continue rule resolution.

According to embodiments displaying a list of all second terms for which a definition statement exists in a catalogue when the translated rule includes an irresolvable term. Receiving an indication of the user that the irresolvable term is a synonym to one of the displayed second terms and replacing, by the rule generator 154 in response to the indication, the irresolvable term in the rule by the indicated second term and continue rule resolution.

According to embodiments displaying a list of all natural language patterns specified in the plurality of expressions when the translated rule includes an irresolvable term. Receiving an indication of the user that the irresolvable term represents one of the displayed natural language patterns and replacing, by the rule generator 154 in response to the indication, the irresolvable term in the rule by the indicated natural language pattern and continue rule resolution.

According to embodiments, prompting a user to create, via a NL rule editor 156, a new definition for the irresolvable term when the translated rule includes an irresolvable term. The new definition comprising the irresolvable term as new second term and comprising a definition statement for the new second term in the form of one or more natural language patterns. Storing the created definition in a catalogue and replacing the irresolvable term in the rule by the definition statement for created definition.

According to embodiments, prompting a user to store the new NL rule in its current state for completing the resolution of the new NL rule at a later time, when the translated rule includes an irresolvable term. This may allow a user to finish the term definition and rule generation task later. Moreover, adding new definition for resolving a particular rule, whereby the new definition is available for resolving other new NL rules may provide for a flexible system whose complexity will grow over the time as new definitions are added. The syntax concept allows mapping synonym terms to existing first and second terms.

According to embodiments, receiving an indication of the user that the irresolvable term is a synonym to one of the first terms or to one of the second terms, when the translated rule includes an irresolvable term. Updating a list of known synonyms by adding the irresolvable term and an association to a data object to the list, the associated data object being the first or second term to which the irresolvable term is a synonym. Alternatively, receiving an indication of the user that the irresolvable term represents one of the language patterns of the expressions, when the translated rule includes an irresolvable term. Updating a list of known synonyms by adding the irresolvable term and an association to a data object to the list, the associated data object being an association to the language pattern it represents.

The features may be advantageous as the synonym list may be extended semi-automatically upon entering definitions comprising a new, irresolvable term.

For example, the data governance framework may prompt the user to select terms and/or enter or modify definitions and NL rules via a graphical user interface (GUI) of a NL rule editor 156. The NL rule editor 156 can be implemented for example as a piece of program logic that is interoperable with the rule generator 154 and/or that is operable to provide a GUI for enabling a user to specify NL rules using natural language syntax and provide the NL rule to the rule generator 154.

According to embodiments, providing a second mapping that maps each of a plurality of rules engines (RE1, RE2, RE3) to one or more data sources. Providing a third mapping that maps one or more of the rule engines (RE1, RE2, RE3) to one or more types of technical rules comprising technical language patterns interpretable by the type of rule engine. Each of the one or more technical rules identifies the data sources whose name is contained in the technical rule. Each of the one or more technical rules evaluates the second and third mapping for identifying the one or more rules engines (RE1, RE2, RE3) capable of interpreting the functionally equivalent, technical language pattern contained in the technical rule and being in addition mapped to the data sources whose name is contained in the rule. Each of the one or more technical rules selectively uses the one or more identified rule engines for executing the technical rule selectively on the one or more data sources whose names are identified in the technical rule.

It may be the case that a particular technical rule is syntactically interpretable by a particular rule engine (RE) but nevertheless the RE shall not be used for performing the technical data governance rules on a particular set of data containers. By providing and evaluating the second and third mappings, a highly complex and flexibly adaptable rule-based data governance framework may be provided that comprises a plurality of different rule engines, data containers, and technical rules and that supports a complex way of combining the elements.

For example, the first, second and/or third mappings may be implemented as database tables or files.

According to embodiments, the second mapping maps each of a plurality of rules engines stored in a rule repository 114 to one or more data sources, for example, directories, files, tables or columns of a database comprising data, whereby the assignment implies that the rule engine (RE1, RE2, RE3) is able to perform one or more data governance checks on the data in the assigned data container. The third mapping may map one or more of the rule engines (RE1, RE2, RE3) to one or more types of technical rules comprising technical language patterns interpretable by the type of rule engine (RE1, RE2, RE3). For example, in case a rule engine (RE1, RE2, RE3) requires a comma-separated file as input, the rule engine is not mapped to a technical rule that comprises an SQL-based data consistency check and expects a database table name as input. Rather, the third mapping may assign the rule engine (RE1, RE2, RE3) to all technical rules belonging to a technical rule type that can be interpreted and executed by the rule engine. Other examples for types of technical rule types are SQL-based rules, rules specified in a vendor specific, proprietary syntax, or the like. The third mapping allows assigning sets of technical rules belonging to the same type, e.g. comprising a particular type of technical language pattern and/or requiring the same input data format or being provided from a particular vendor to a rule engine that is able to run the kind of analysis specified in the rule. For example, the technical language patterns that replace respective natural language patterns during rule generation may be tagged or labeled with rule-type IDs like "SQL" or "<<RE-vendor-name>>" and the rule generator 154 may evaluate the tags upon creating a technical rule and may automatically update the third mapping by assigning an ID of the newly generated technical rule to one or more IDs of respective rule engines capable of executing the technical rule.

According to embodiments, the method comprising automatically performing each of the one or more generated technical rules by one of the rule engines.

According to embodiments, each of the technical rules is one of a rule implementing a formal or a semantic data consistency check, a rule implementing a filter for filtering out confidential data from messages leaving a computer system or network, a rule implementing a virus scanner, a rule implementing a data completeness check, a rule implementing a data corruption check, a rule implementing a data processing operation, for example, data consolidation, merging, aggregation, synchronization, data backup, a the like, a rule implementing a data transformation (including data masking), a rule implementing a data movement (including archiving), a rule implementing a data logging, and the like.

Thus, a very broad spectrum of data governance policies may be integrated in a single, highly flexible data governance framework.

According to embodiments, the method is used for controlling the quality of products, for example, in an industry 4.0 production line. During the production process of a product, a plurality of features of the product, for example, its dimensions, the homogeneity of its color, the resistance to pulling forces or any other product-related feature, are obtained by various sensor devices, e.g. cameras, microphones, voltage meters or the like. The measured product features are stored as attributes in one or more data containers of a volatile or non-volatile storage medium. The data content of the data containers is regularly evaluated in a fully automated manner by the rule engines (RE1, RE2, RE3) of the data governance framework. According to embodiments of the invention, a plurality of technical rules may be executed by the rule engines RE1-RE3 automatically in accordance with the second and third mappings in the catalogue. For example, the technical rules are executed by the ones of the rule engines (RE1, RE2, RE3) to which they are assigned in the third mapping and the technical rules may be performed on the data containers assigned to the rule engines in the second mapping. In case one of the rule engines determines that one of the executed technical data governance rules detects that one or more attributes of a particular product violate a quality criterion specified in a technical rule, the rule engine or the data governance framework 115 comprising the rule engine (RE1, RE2, RE3) automatically outputs a warning message, automatically separates the particular product and/or automatically terminates the processing or manufacturing of the product. Thus, embodiments of the invention are used for increasing the quality, reliability and flexibility of quality management in an industrial production workflow, in particular in an industry 4.0 context.

Concretely, enforcing data governance policies means that some rules have to be applied on the data to verify that the governance rules defined by the policies are verified, or to apply automatically some actions on the data, so that those rules are respected. Example of governance rules could be data masking rules, ensuring that sensitive personal information are automatically masked when accessed by non-authorized users, or data quality rules verifying that data of a certain class matches certain conditions to be considered as valid data, or rules regulating who is authorized to access the data, etc.

Those rules are typically implemented in different engines specialized in one aspect of data governance. For instance data masking rules could be implemented using the IBM InfoSphere Optim product. Data quality rules could be implemented using IBM InfoSphere Information Analyzer, a Master Data Management software or even simple SQL statements.

Figure 5:
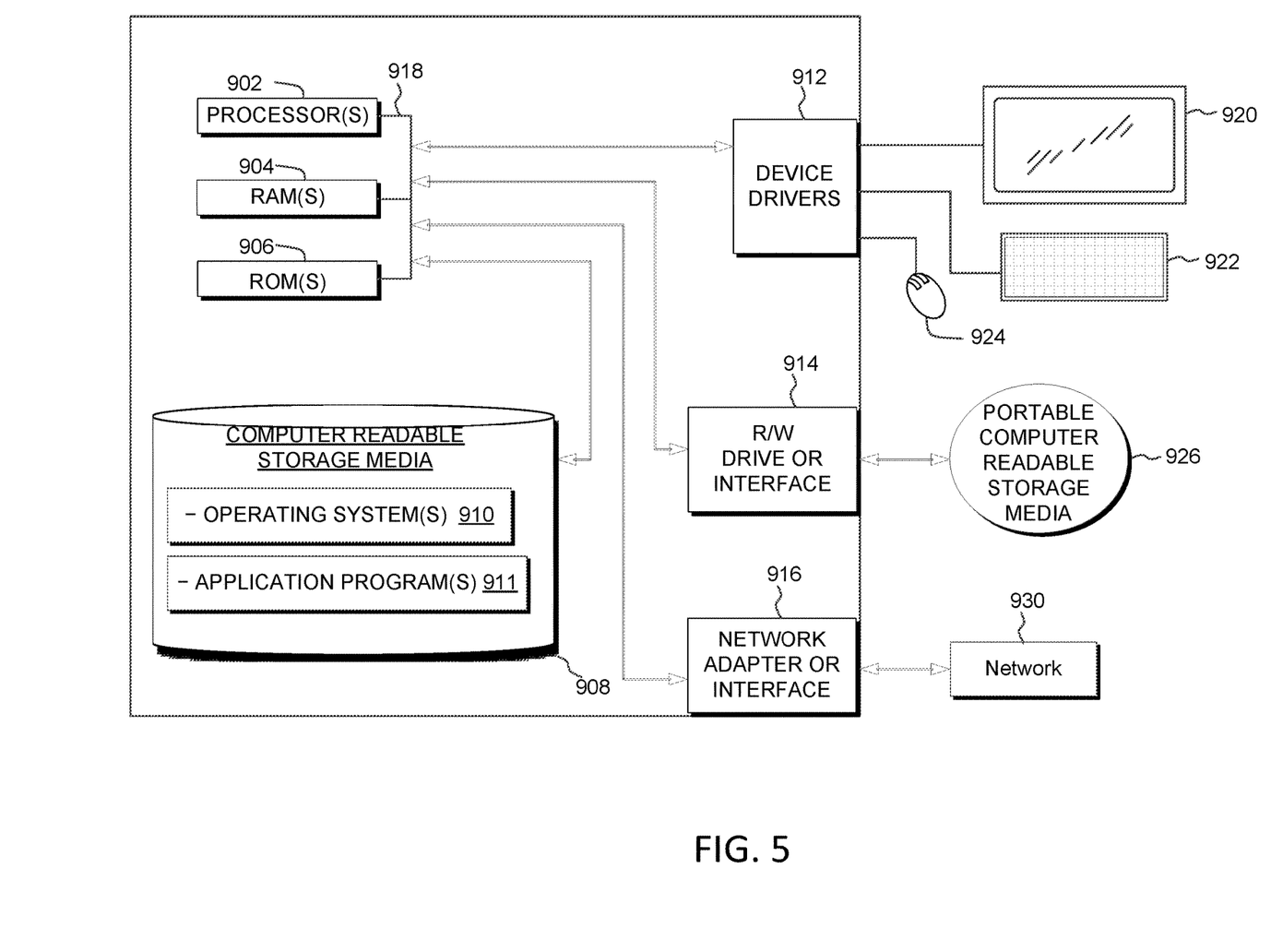
FIG. 5 is a block diagram of components of a computing device of the system comprising a data governance framework of FIG. 1, in accordance with embodiments of the present invention.

FIG. 5 depicts a block diagram of components of computing system 116 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computer system 116 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, framework 115 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computer system 116 may also include a R/W drive or interface 914 to read from and write to one or more portable computer readable storage media 926. Application programs 911 on computer system 116 may be stored on one or more of the portable computer readable storage media 926, read via the respective R/W drive or interface 914 and loaded into the respective computer readable storage media 908.

Computer system 116 may also include a network adapter or interface 916, such as a TCP/IP adapter card or wireless communication adapter (such as a 4G wireless communication adapter using OFDMA technology). Application programs 911 on computer system 116 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computer system 116 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
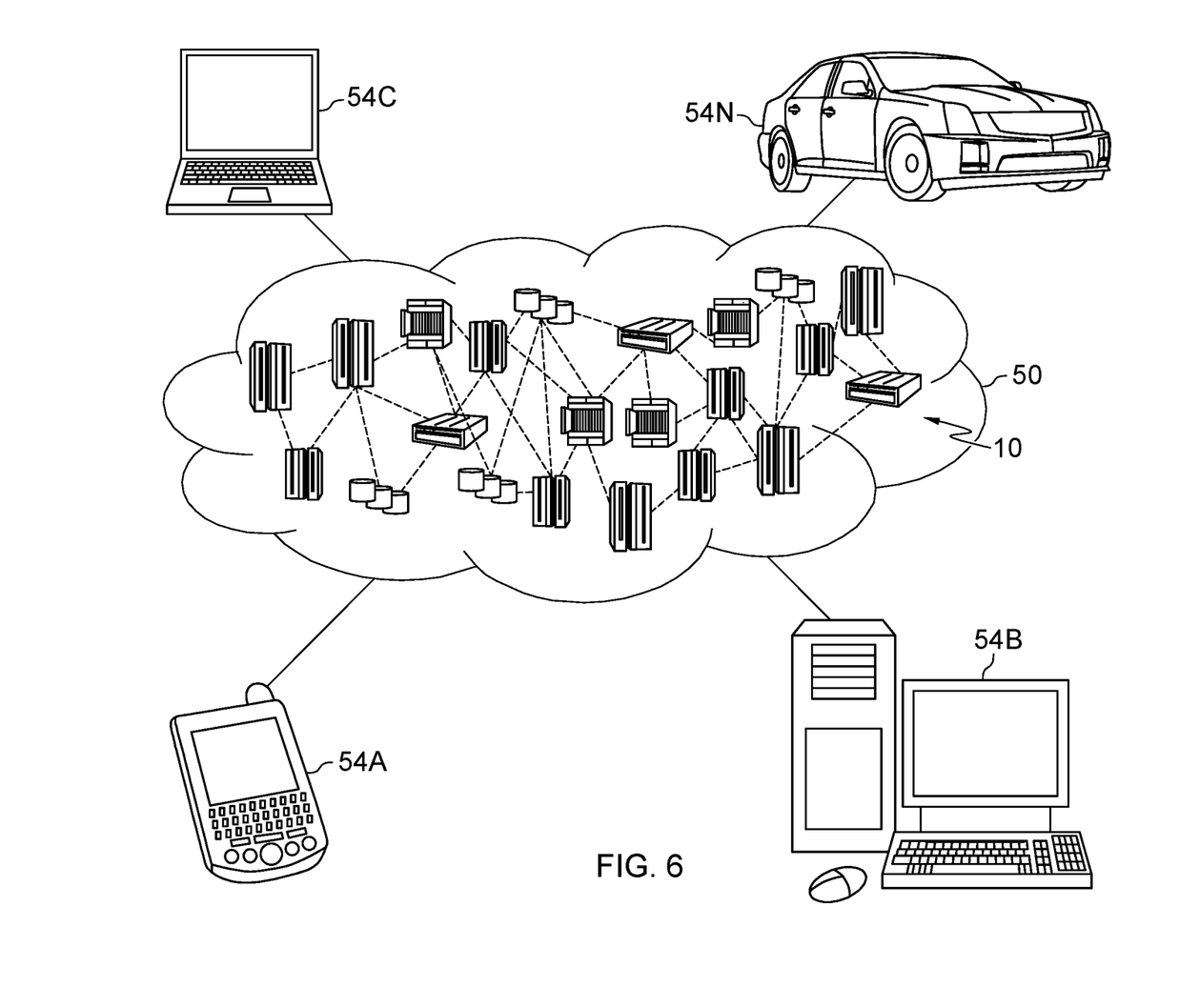
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
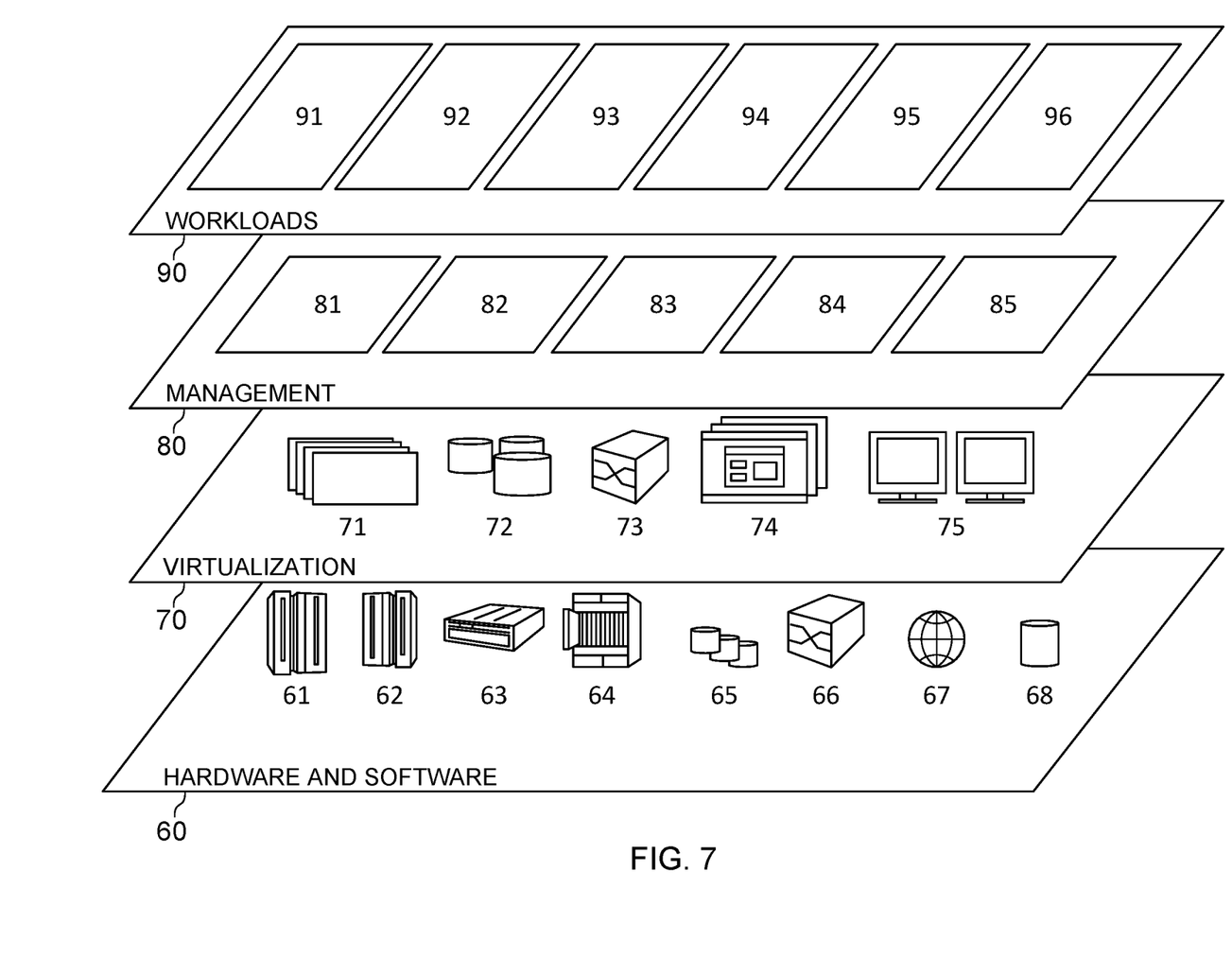
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and framework 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A computer-implemented method for supplementing a data governance framework with one or more new data governance technical rules, the method comprising:
    providing a plurality of expressions, each expression being a data structure assigning a natural language pattern to one or more functionally equivalent, technical language patterns interpretable by a respective rule engine;
    providing a first mapping that maps first terms to data sources;
    receiving, by a rule generator, a new natural language ("NL") rule, the new NL rule being a data governance rule comprising one or more natural-language patterns and comprising one or more first terms;
    resolving, by the rule generator, the new NL rule into the one or more new technical rules, the resolution comprising:
        replacing the one or more natural language patterns of the received new NL rule by one or more functionally equivalent, technical language patterns in accordance with at least one of the plurality of expressions, thereby creating one or more translated rules from the new NL rule;
        replacing each of the first terms in each of the one or more translated rules with the name of the data source mapped to the first term in the first mapping;
        assigning to each of the one or more translated rules the one of the rules engines capable of interpreting the one or more functionally equivalent, technical language patterns contained in the translated rule, thereby providing the one or more technical rules, each of the technical rules being functionally equivalent to the new NL rule and being interpretable by its assigned rules engine; and
        storing the one or more technical rules in a rule repository.

2. The computer-implemented method of claim 1, wherein each of the rule engines are a data governance tool.

3. The computer-implemented method of claim 1, wherein each of the first terms represents a first data object type, each of the first terms being mapped in the first mapping to a first data source used as dedicated data container for selectively storing data object instances of the one of the first data object types represented by the first term mapped to the data source, the data container being free of instances of other first data object types represented by other first terms contained in the first mapping.

4. The computer-implemented method of claim 1, wherein the received new NL rule comprises one or more second terms, each of the second terms being a term not being assigned in the first mapping one of the data sources, the method comprising:
    providing a set of definitions, each definition being a data structure associating a second term with a definition statement of the second term, the definition statement being specified in natural language comprising one or more natural language patterns, whereby the definition statement of one or more of the definitions comprises one or more of the first and/or one or more the second terms.

5. The computer-implemented method of claim 4, wherein each of the second terms represents a second data object type, at least two of the second terms respectively representing a second data object type being a sub-type of a first data object type represented by one of the first terms, whereby the instances of the at least two second data object types are stored in the same data container, the data container being represented by the particular first term and being mapped to the particular first term in the first mapping.

6. The computer-implemented method of claim 4, wherein the resolving of the new NL rule into one or more new technical rules further comprising:
    replacing each second term contained in the received or translated rule with the definition statement of the second term for outputting a definition-resolved rule; and
    replacing each natural language pattern contained in the one or more definition statements of the definition-resolved rule by one or more technical language patterns being, according to one or more of the expressions, functionally equivalent to the replaced natural language patterns.

7. The computer-implemented method of claim 6, wherein the resolving of the new NL rule into one or more new technical rules further comprising:
checking if a definition statement in the definition-resolved rule comprises one or more further first or second terms;
if the definition-resolved rule comprises at least one further second term, iteratively repeating the steps of claim 6 until a termination criterion is reached;
if the definition-resolved rule comprises at least one further first term, replacing each first term in the definition-resolved rule with a name of the data source mapped to the term in the first mapping.

8. The computer-implemented method of claim 7, wherein the termination criterion being one of:
the translated and definition-resolved rule is free of any first term and is free of any second term;
a maximum number of iterations is reached;
the rule generator determines that the translated and definition-resolved rule comprises a term that is neither a first term nor a second term.

9. The computer-implemented method of claim 1, wherein the resolving of the new NL rule into one or more new technical rules further comprising checking, by the rule generator, if the translated rule comprises an irresolvable term.

10. The computer-implemented method of claim 9, wherein the method further comprising, in case the translated rule comprises an irresolvable term:
displaying a list of all first terms contained in the first mapping;
receiving an indication of the user that the irresolvable term is a synonym to one of the displayed first terms; and
replacing, by the rule generator response to the indication, the irresolvable term in the rule by the indicated first term and continue rule resolution.

11. The computer-implemented method of claim 9, wherein the method further comprising, in case the translated rule comprises an irresolvable term:
displaying a list of all second terms for which a definition statement exists in a catalogue;
receiving an indication of the user that the irresolvable term is a synonym to one of the displayed second terms; and
replacing, by the rule generator in response to the indication, the irresolvable term in the rule by the indicated second term and continue rule resolution.

12. The computer-implemented method of claim 9, wherein the method further comprising, in case the translated rule comprises an irresolvable term:
displaying a list of all natural language patterns specified in the plurality of expressions;
receiving an indication of the user that the irresolvable term represents one of the displayed natural language patterns; and
replacing, by the rule generator in response to the indication, the irresolvable term in the rule by the indicated natural language pattern and continue rule resolution.

13. The computer-implemented method of claim 9, wherein the method further comprising, in case the translated rule comprises an irresolvable term:
prompting a user to create, via a rule editor, a new definition for the irresolvable term, the new definition comprising the irresolvable term as new second term and comprising a definition statement for the new second term in the form of one or more natural language patterns;
storing the created definition in a catalogue; and
replacing the irresolvable term in the rule by the definition statement for created definition.

14. The computer-implemented method of claim 9, wherein the method further comprising, in case the translated rule comprises an irresolvable term:
prompting a user to store the new NL rule in its current state for completing the resolution of the new NL rule at a later time.

15. The computer-implemented method of claim 9, wherein the method further comprising, in case the translated rule comprises an irresolvable term:
receiving an indication of the user that the irresolvable term is a synonym to one of the first terms or to one of the second terms, or that the irresolvable term represents one of the language patterns of the expressions; and
updating a list of known synonyms by adding the irresolvable term and an association to a data object to the list, the associated data object being the first or second term to which the irresolvable term is a synonym or being an association to the language pattern it represents.

16. The computer-implemented method of claim 1, wherein the method comprising:
providing a second mapping that maps each of a plurality of rules engines to one or more data sources;
providing a third mapping that maps one or more of the rule engines to one or more types of technical rules comprising technical language patterns interpretable by the type of rule engine;
for each of the one or more technical rules:
identifying the data sources whose name is contained in the technical rule;
evaluating the second and third mapping for identifying the one or more rules engines capable of interpreting the functionally equivalent, technical language pattern contained in the technical rule and being in addition mapped to the data sources whose name is contained in the rule; and
selectively using the one or more identified rule engines for executing the technical rule selectively on the one or more data sources whose names are identified in the technical rule.

17. The computer-implemented method of claim 1, wherein the method comprising automatically performing each of the one or more generated technical rules by one of the rule engines.

18. The computer-implemented method of claim 1, wherein each of the technical rules being one of:
a rule implementing a formal or a semantic data consistency check;
a rule implementing a filter for filtering out confidential data from messages leaving a computer system or network;
a rule implementing a virus scanner;
a rule implementing a data completeness check;
a rule implementing a data corruption check;
a rule implementing a data logging;
a rule implementing a data movement;
a rule implementing a data transformation; and
a rule implementing a data processing operation.

* * * * *